United States Patent
Yoon et al.

(10) Patent No.: US 9,960,615 B2
(45) Date of Patent: May 1, 2018

(54) METHOD FOR CONTROLLING POWER OF ELECTRONIC DEVICE AND ELECTRONIC DEVICE THEREOF

(71) Applicant: Samsung Electronics Co., Ltd., Gyeonggi-do (KR)

(72) Inventors: Sung-Geun Yoon, Gyeongg-do (KR); Ju-Nyun Kim, Gyeonggi-do (KR); Se-Won Oh, Gyeonggi-do (KR); Kisun Lee, Gyeonggi-do (KR); Ku-Chul Jung, Seoul (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 448 days.

(21) Appl. No.: 14/624,020

(22) Filed: Feb. 17, 2015

(65) Prior Publication Data
US 2015/0234363 A1    Aug. 20, 2015

(30) Foreign Application Priority Data

Feb. 20, 2014  (KR) .................. 10-2014-0019598

(51) Int. Cl.
*H02J 7/00*    (2006.01)

(52) U.S. Cl.
CPC .......... *H02J 7/0036* (2013.01); *H02J 7/0029* (2013.01); *H02J 7/0031* (2013.01); *H02J 7/0044* (2013.01); *H02J 2007/0039* (2013.01); *Y10T 307/832* (2015.04)

(58) Field of Classification Search
CPC ........ H02M 3/10; H02M 3/135; H02M 3/156; H02M 3/155; H02M 3/1563; H02J 7/0045; H02J 7/0004; G05F 1/56; G05F 1/468
USPC ........ 323/265, 273, 282, 284, 351; 320/106, 320/112, 113, 115
See application file for complete search history.

(56) References Cited

U.S. PATENT DOCUMENTS 7,956,575 B2    6/2011  Kawano et al.
8,276,007 B2 *  9/2012  Hara ................ H02M 3/33515
                                                    323/235

(Continued)

FOREIGN PATENT DOCUMENTS

JP    2007-300730 A    11/2007
KR    10-2006-0006248 A    1/2006

(Continued)

*Primary Examiner* — Adolf Berhane
(74) *Attorney, Agent, or Firm* — Cha & Reiter, LLC

(57) ABSTRACT

An electronic device and method and power supply are disclosed. The electronic device includes comprising a connector for electrically coupling with an external power supply unit, and a processor. The processor implements the method, which includes detecting a connection state with the external power supply unit, and detecting whether power supplied from the external power supply unit is abnormal, and controlling the power when the power supplied has an abnormal value. The power supply may include a connector for electrically coupling with an electronic device, and a processor for detecting a connection state with the electronic device, detecting whether power supplied to the electronic device by the power supply unit has an abnormal value, and controlling the supplied power when the power is abnormal.

19 Claims, 10 Drawing Sheets

(56) References Cited

U.S. PATENT DOCUMENTS

| | | | | |
|---|---|---|---|---|
| 2009/0009143 A1* | 1/2009 | Odaohhara | ............ | H02J 7/045 320/162 |
| 2013/0221926 A1* | 8/2013 | Furtner | .................. | G06F 1/263 320/129 |
| 2014/0288435 A1* | 9/2014 | Richards | ............ | A61B 5/02427 600/479 |
| 2015/0054467 A1* | 2/2015 | Takano | ................ | H01M 10/48 320/136 |
| 2015/0092311 A1* | 4/2015 | Wang | .................... | H02H 1/043 361/86 |
| 2015/0380967 A1* | 12/2015 | Toya | .................... | H01M 10/44 320/128 |
| 2016/0261127 A1* | 9/2016 | Worry | ................ | G01R 31/3624 |

FOREIGN PATENT DOCUMENTS

| | | |
|---|---|---|
| KR | 10-2006-0064829 A | 6/2006 |
| KR | 10-2011-0066827 A | 6/2011 |
| KR | 10-2013-0018506 A | 2/2013 |
| KR | 10-2013-0073111 A | 7/2013 |

\* cited by examiner

METHOD FOR CONTROLLING POWER OF ELECTRONIC DEVICE AND ELECTRONIC DEVICE THEREOF

CROSS-REFERENCE TO RELATED APPLICATION(S)

This application claims the benefit under 35 U.S.C. § 119(a) from a Korean patent application filed on Feb. 20, 2014 in the Korean Intellectual Property Office and assigned Serial number 10-2014-0019598, the entire disclosure of which is hereby incorporated by reference.

BACKGROUND

Field of the Disclosure

This present disclosure relate to a method for controlling power of electronic device and electronic device thereof.

Description of the Related Art

Direct current power supplied by a power adapter may be used for charging a battery of an electronic device, such as a smartphone or tablets, etc., or for operating the device. Such power adapters come in many forms, including classifications such as a Travel Adapter (TA) adapted to be conveniently carried by a user, and a Cradle Adapter (CA) for safely supporting the smartphone or the tablet PC in an upright position while charging, etc.

Electronic devices such as smartphones and tablet PCs, etc. may be connected with the power adapter via a connector, which often include a plurality of pin terminals. The pin terminals of the connector are sometimes short-circuited by, for example, the presence of foreign material impeding electrical flow, or even physically short-circuited by force exerted by a user causing a poor or broken electrical connection, which may occur during an attachment or detachment process. In the case where pin terminals of the connector are short-circuited or bad connection is established, an abnormal overcurrent or overvoltage event may occur, and thus, the temperature of the shorted portion or neighboring portion of the pin terminal may rise rapidly, and an electronic components or other components of the pin terminal, the connector, etc. may be damaged or destroyed.

SUMMARY

An aspect of the present disclosure is to provide a method for controlling power of an electronic device, and an electronic device thereof, capable of disabling power when an power abnormality is generated due to a short-circuit of connector pin terminals, whether caused by foreign substances or a poor connection, therefore preventing the occurrence of an overcurrent or an overvoltage in the electronic device, which may be devices such as a travel adapter, a cradle adapter, etc., or the charging device, such as a smartphone or a tablet, etc.

In accordance with one aspect of the present disclosure, a method for operating an electronic device is disclosed, including detecting a connection state with a power supply unit, determining whether power supplied from the power supply unit is abnormal, and controlling the power supplied from the power supply unit according to the determination.

In accordance with another aspect of the present disclosure, an electronic device is disclosed including a connector for electrically coupling with an external power supply unit, and a processor for detecting a connection state with the external power supply unit, detecting whether power supplied from the external power supply unit is abnormal, and controlling the power when the power supplied is abnormal.

In accordance with still another aspect of the present disclosure, a method of a power supply unit is disclosed, including detecting by a processor a connection state with an electronic device, determining whether power supplied to the electronic device is abnormal, and controlling the power supplied to the electronic device according to the determination.

In accordance with yet another aspect of the present disclosure, a power supply unit including a connector for electrically coupling with an electronic device, and a processor for detecting a connection state with the electronic device, detecting whether power supplied to the electronic device by the power supply unit is abnormal, and controlling the supplied power when the power is abnormal.

Other aspects and features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other aspects, features and advantages of certain embodiments of the present disclosure will be more apparent from the following description taken in conjunction with the accompanying drawings in which.

Throughout the drawings, like reference numerals will be understood to refer to like parts, components and structures.

DETAILED DESCRIPTION

Figure 1:
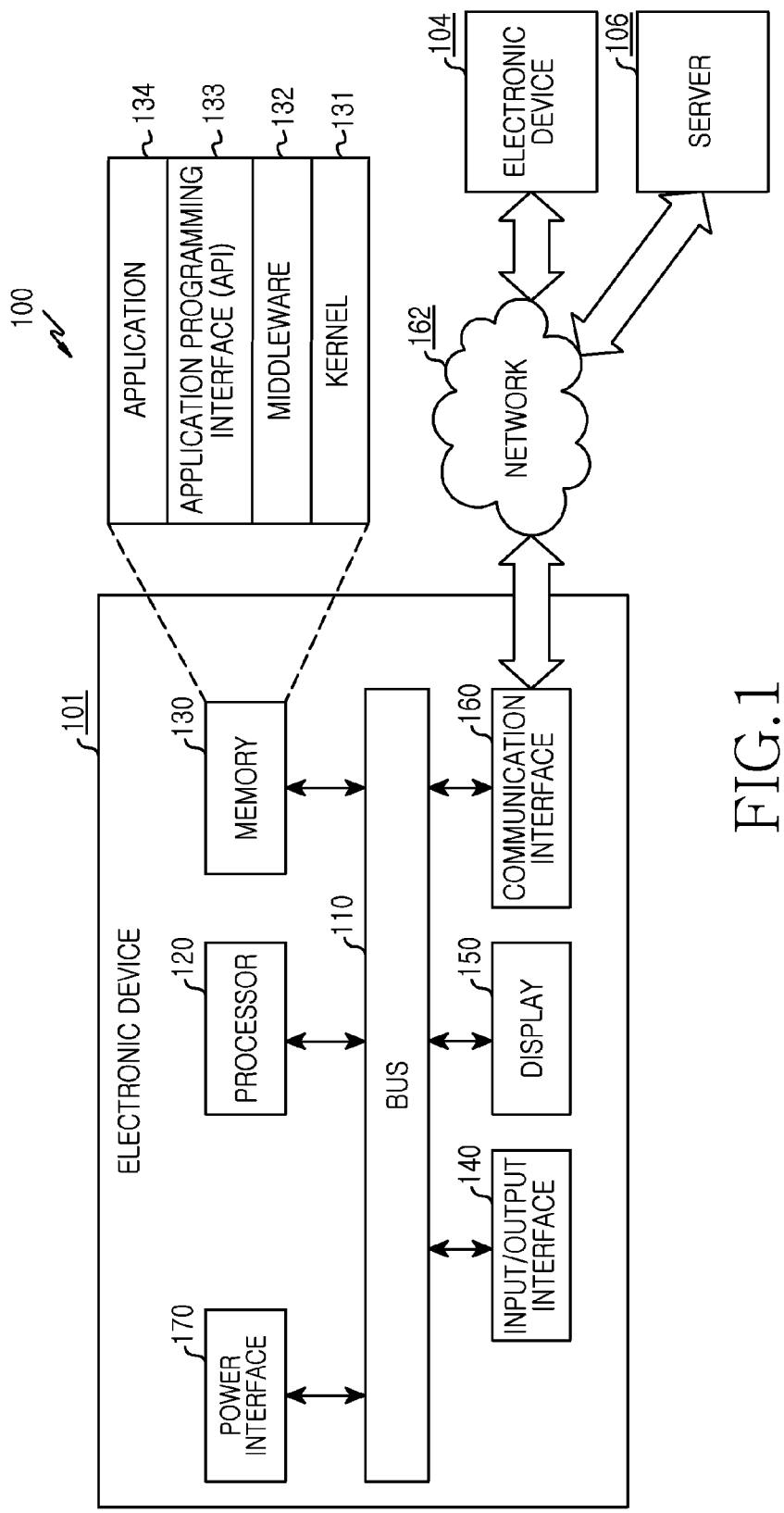
FIG. 1 is a view illustrating network configuration including an electronic device according to various embodiments of the present disclosure.

Hereinafter, various embodiments of the present disclosure are described with reference to the accompanying drawings. The various embodiments of the present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the ambit of the various embodiments of the present disclosure. In the drawing, like reference numerals are used for like elements.

Expressions such as "include" or "may include", etc. that may be used for various embodiments of the present disclosure indicate existence of a disclosed relevant function, operation, or element, etc., and do not limit additional one or more functions, operations, or elements, etc. Also, it should be understood that terminologies such as "include" or "have", etc. in various embodiments of the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in various embodiments of the present disclosure includes a certain and all combinations of words listed together. For example, "A or B" may include A and may include B, or include both A and B. In various embodiments of the present disclosure, expressions such as "1st", "2nd", "first" or "second", etc. may modify various elements of various embodiments of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of various embodiments of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

Terminology used in various embodiments of the present disclosure is used for explaining a specific embodiment and is not intended for limiting various embodiments of the present disclosure. Unless clearly expressed otherwise, expression of the singular includes expression of the plural. Unless defined differently, all terminologies used herein including technological or scientific terminologies have the same meaning as that generally understood by a person of ordinary skill in the art to which various embodiments of the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device according to various embodiments of the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (ex: a head-mounted-device (HMD) such as electronic glasses, an electronic clothing, an electronic bracelet, an electronic necklace, an electronic appcessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (for example, Samsung HomeSync™, Apple TV™, or Google TV™), game consoles, an electronic dictionary, an electronic key, a camcorder, or an electronic frame.

According to certain embodiments, an electronic device may include at least one of various medical devices (ex: Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (ex: a navigation device for a ship, a gyro compass, etc.), an avionics, a security device, a head unit for a vehicle, a robot for an industrial use or a home use, an automatic teller's machine (ATM) of a financial institution, or a point of sales (POS) of a store.

According to certain embodiments, an electronic device may include at least one of a furniture or a portion of a building/structure including a communication function, an electronic board, an electronic signature receiving device, a projector, or various measurement devices (ex: waterworks, electricity, gas, or radio wave measuring device, etc.). An electronic device according to various embodiments of the present disclosure may be a combination of one or more of the above-described devices. Also, an electronic device according to various embodiments of the present disclosure may be a flexible device. Also, it is obvious to a person of ordinary skill in the art that the electronic device according to various embodiments of the present disclosure is not limited to the above-described devices.

Hereinafter, an electronic device according to various embodiments of the present disclosure is described with reference to the accompanying drawings. A terminology of a user used in various embodiments of the present disclosure may indicate a person who uses an electronic device or a device (ex: an artificial intelligence electronic device) that uses the electronic device.

FIG. 1 is a view illustrating network configuration 100 including an electronic device 101 according to various embodiments of the present disclosure. Referring to FIG. 1, the electronic device 101 may include a bus 110, a processor 120, a memory 130, an input/output (I/O) interface 140, a display 150, a communication interface 160, and a power interface 170, etc.

The power interface 170 may include a connector connected with various types of power adapters such as a TA or a CA, etc., for example, and prevents occurrence of an overcurrent or an overvoltage by cutting off power in the case where pin terminals of the connector are short-circuited by foreign substances or power abnormality is generated due to bad connection, etc. The power interface 170 may cooperate with the processor 120. The bus 110 may a circuit for connecting the above-described elements with each other, and transferring communication (ex: a control message) between the above-described elements.

The processor 120 may receive an instruction from the above-described other elements (ex: the memory 130, the I/O interface 140, the display 150, the communication interface 160, etc.) via, for example, the bus 120, decipher the received instruction, and execute an operation or data processing corresponding to the deciphered instruction.

The memory 130 may store an instruction or data received from the processor 120 or other elements (ex: the I/O interface 140, the display 150, the communication interface 160, etc.) generated by the processor 120 or the other elements. The memory 130 may include programming modules such as, for example, a kernel 131, a middleware 132, an application programming interface (API) 133, or an application 134, etc. Each of the above-described programming modules may be configured using a software, a firmware, a hardware, or a combination of at least two of these.

The kernel 131 may control or manage system resources (ex: the bus 110, the processor 120, or the memory 130, etc.) used for executing an operation or a function implemented in the rest of the programming modules, for example, the middleware 132, the API 133, or the application 134. Also, the kernel 131 may provide an interface for allowing the middleware 132, the API 133, or the application 134 to access an individual element of the electronic device 101 and control or manage the same.

The middleware 132 may perform a mediation role so that the API 133 or the application 134 may communicate with the kernel 131 to give and take data. Also, in connection with task requests received from the applications 134, the middleware 132 may perform a control (ex: scheduling or load balancing) for a task request using, for example, a method of assigning priority that may use a system resource (ex: the bus 110, the processor 120, or the memory 130, etc.) of the electronic device 101 to at least one of the applications 134.

The API 133 is an interface for allowing the application 134 to control a function provided by the kernel 131 or the middleware 132, and may include at least one interface or function (ex: an instruction) for file control, window control, image processing, or character control, etc.

According to various embodiments of the present disclosure, the application 134 may include an SMS/MMS application, an e-mail application, a calendar application, alarm application, a health care application (ex: an application for measuring quantity of motion or blood sugar, etc.), or an environment information application (ex: an application providing atmospheric pressure, humidity or temperature information, etc.). Additionally or alternatively, the application 134 may be an application related to information exchange between the electronic device 101 and an external electronic device (ex: the electronic device 104). The application related to the information exchange may include, for example, a notification relay application for transferring specific information to the external electronic device or a device management application for managing the external electronic device.

For example, the notification relay application may include a function for transferring notification information generated from a different application (ex: an SMS/MMS application, an e-mail application, a health care application, or an environment information application) of the electronic device 101 to an external electronic device (ex: the electronic device 104). Additionally or alternatively, the notification relay application may, for example, receive notification information from an external electronic device (ex: the electronic device 104) and provide the same to a user.

The device management application may manage (ex: install, delete, or update) a function (ex: turn-on/turn-off of an external electronic device itself (or some constituent part) or luminance (or resolution) control of a display) of an external electronic device (ex: the electronic device 104) communicating with the electronic device 101 and an application operating in the external electronic device or a service (ex: a communication service or a message service) provided by the external electronic device.

According to various embodiments of the present disclosure, the application 134 may include a designated application depending on an attribute (ex: a kind of an electronic device) of the external electronic device (ex: the electronic device 104). For example, in the case where the external electronic device is an MP3 player, the application 134 may include an application related to music reproduction. Similarly, in the case where the external electronic device is a mobile medical health care device, the application 134 may include an application related to health care. According to an embodiment, the application 134 may include at least one of an application designated in the electronic device 101 and an application received from the external electronic device (ex: the server 106 or the electronic device 104).

The I/O interface 140 may transfer an instruction or data input from a user via an I/O unit (ex: a sensor, a keyboard, or a touchscreen) to the processor 120, the memory 130, and the communication interface 160 via the bus 110, for example. For example, the I/O interface 140 may provide data regarding a user's touch input via the touchscreen to the processor 120. Also, the I/O interface 140 may, for example, output an instruction or data received via the bus 110 from the processor 120, the memory 130, and the communication interface 160, via the I/O unit (ex: a speaker or a display). For example, the I/O interface 140 may output voice data processed by the processor 120 to a user via a speaker.

The display 150 may display various information (ex: multimedia data or text data, etc.) to a user. The communication interface 160 may connect communication between the electronic device 101 with an external device (ex: the electronic device 104 or the server 106). For example, the communication interface 160 may be connected with a network 162 via wireless communication or wired communication to communicate with the external device. The wireless communication may, for example, include at least one of Wireless Fidelity (Wi-Fi), Bluetooth (BT), Near Field Communication (NFC), Global Positioning System (GPS), or cellular communication (ex: LTE, LTE-A, CDMA, WCDMA, UMTS, WiBro, or GSM, etc.). The wired communication may include, for example, at least one of Universal Serial Bus (USB), High Definition Multimedia Interface (HDMI), recommended standard 232 (RS-232), and plain old telephone service (POTS).

According to an embodiment of the present disclosure, the network 162 may be a telecommunications network. The telecommunications network may include at least one of a computer network, the Internet, an Internet of things, or a telephone network. According to an embodiment, a protocol (ex: a transport layer protocol, a data link layer protocol, or a physical layer protocol) for communication between the electronic device 101 and an external device may be supported by at least one of the application 134, the application programming interface 133, the middleware 132, the kernel 131, or the communication interface 160.

Figure 2:
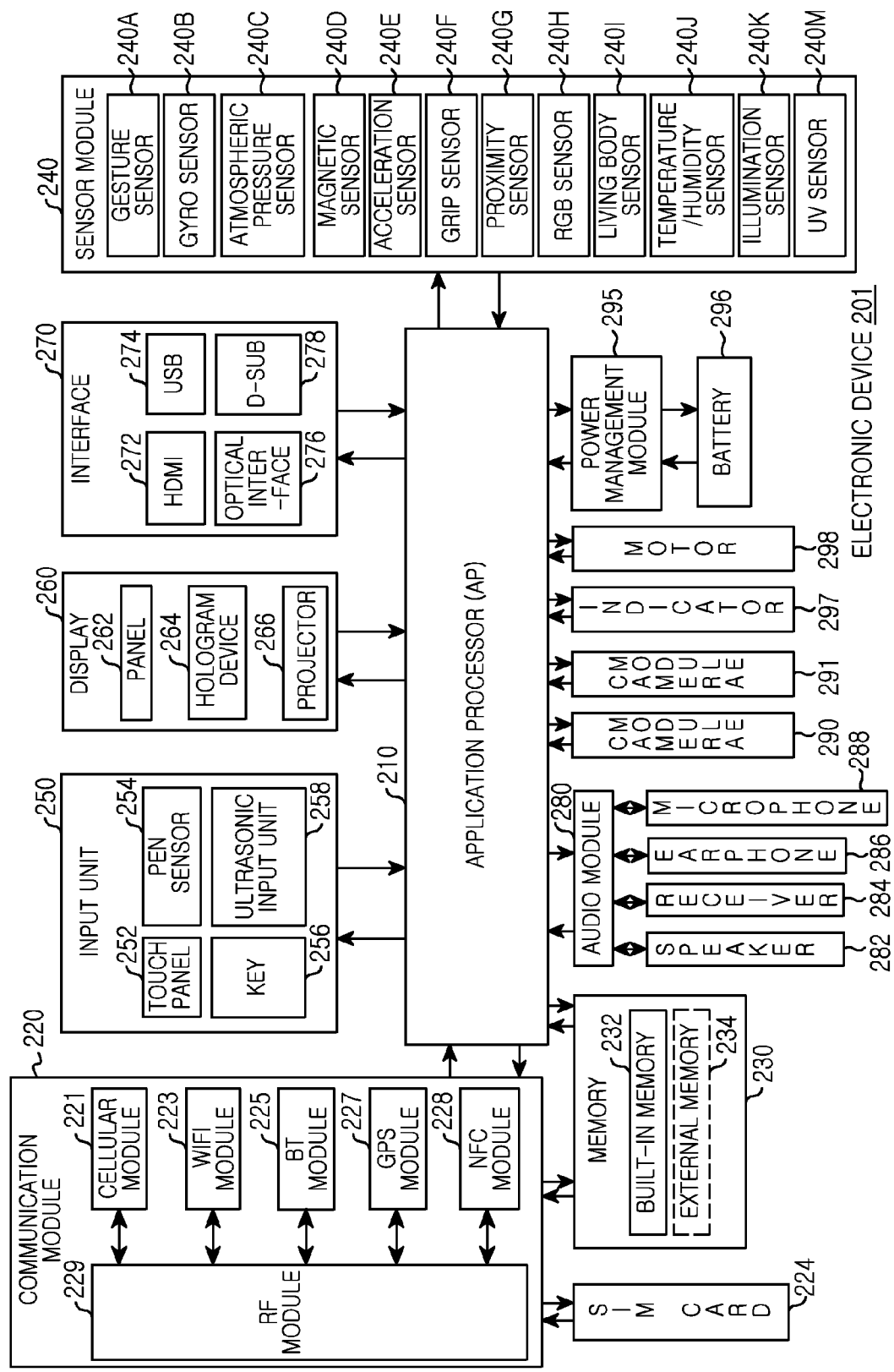
FIG. 2 is a block diagram illustrating an electronic device according to various embodiments of the present disclosure.

FIG. 2 is a block diagram illustrating an electronic device 201 according to various embodiments of the present disclosure. The electronic device 201 may, for example, configure the whole or a portion of the electronic device 101 illustrated in FIG. 1. Referring to FIG. 2, the electronic device 201 may include one or more application processors (APs) 210, a communication module 220, a Subscriber Identification Module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an Operating System (OS) or an application to control a plurality of hardware or software elements connected to the AP 210, and perform various kinds of data processing including multimedia data and operations. The AP 210 may be implemented, for example, as a system on chip (SoC). According to an embodiment, the AP 210 may further include a graphic processing unit (GPU) (not shown).

The communication module 220 (ex: the communication interface 160) may perform data transmission/reception in communication between the electronic device 201 (ex: the electronic device 101) and other electronic devices (ex: the electronic device 104 or the server 106) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (ex: LTE, LTE-A, CDMA, WCDMA, UMTS, WiBro, or GSM, etc.). Also, the cellular module 221 may perform discrimination and authentication of an electronic device within a communication network using, for example, a subscriber identify module (ex: a SIM card 224). According to an embodiment, the cellular module 221 may perform at least a portion of functions that may be provided by the AP 210. For example, the cellular module 221 may perform at least a portion of a multimedia control function.

According to an embodiment of the present disclosure, the cellular module 221 may include a communication processor (CP). Also, the cellular module 221 may be, for example, implemented as an SoC. Though elements such as the cellular module 221 (ex: a communication processor), the memory 230, or the power management module 295, etc. are illustrated as elements separated from the AP 210 in FIG. 2, according to an embodiment, the AP 210 may be implemented to include at least a portion (ex: the cellular module 221) of the above-described elements.

According to an embodiment of the present disclosure, the AP 210 or the cellular module 221 (ex: a communication processor) may load an instruction or data received from at least one of a non-volatile memory or other elements connected thereto onto a volatile memory, and process the same. Also, the AP 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (ex: two or more elements) of the cellular module 221, the Wi-Fi module 223, the BT module 225, the GPS module 227, or the NFC module 228 may be included in one Integrated Circuit (IC) or an IC package. For example, at least a portion (ex: a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identify information (ex: integrated circuit card identifier (ICCID)) or subscriber information (ex: international mobile subscriber identity (IMSI)).

The memory 230 (ex: the memory 130) may include a built-in memory 232 or an external memory 234. The built-in memory 232 may include, for example, at least one of a volatile memory (ex: dynamic RAM (DRAM), static RAM (SRAM), synchronous dynamic RAM (SDRAM)) or a non-volatile memory (ex: one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (ex: RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may detect a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (ex: a microphone 288) in the electronic device 201 via an input tool generating an ultrasonic signal, and enables wireless detection. According to an embodiment, the electronic device 201 may receive a user input from an external device (ex: a computer or a server) connected to the communication module 220 using the communication module 220.

The display 260 (ex: the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, etc. The camera module 291 is a device that may shoot a still image and a moving picture. According to an embodiment, the camera module 291 may include one or more image sensors (ex: a front sensor or a rear sensor), a lens (not shown), an image signal processor (ISP) (not shown), or a flash (not shown) (ex: an LED or xenon lamp).

The power management module 295 may manage power of the electronic device 201, and include all or a portion of the power interface 170 illustrated in FIG. 1. The power management module 295 may include, for example, a power management integrated circuit (PMIC), a charger integrated circuit (IC), or a battery or a fuel gauge. The PMIC may be mounted, for example, inside an integrated circuit or an SoC semiconductor. A charging method may be classified into a wired charging method and a wireless charging method. The charging IC may charge a battery and prevent introduction of an overvoltage or an overcurrent from a charger.

According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (ex: the AP 310), for example, a booting state, a message state, or a charging state, etc. The motor 298 may convert an electric signal to mechanical vibration. Though not shown, the electronic device 201 may include a processor (ex: a GPU) for supporting a mobile TV. The processor for supporting the mobile TV may process media data corresponding to standards, for example, such as digital multimedia broadcasting (DMB), digital video broadcasting (DVB), or a media flow, etc.

Each of the above-described elements of the electronic device according to various embodiments of the present disclosure may be configured using one or more components, and a name of a relevant element may change depending on a kind of the electronic device. The electronic device according to various embodiments of the present disclosure may include at least one of the above-described elements, and a portion of the elements may be omitted or additional other elements may be further included. Also, a portion of the elements of the electronic device according to various embodiments of the present disclosure may combine to configure one entity to equally perform the functions of the relevant elements before the combination.

Hereinafter, a method for controlling power of an electronic device and an electronic device thereof according to various embodiments of the present disclosure are described in detail. The electronic device according to various embodiments of the present disclosure may be various types of electronic devices such as a smartphone, or a tablet PC, etc., and may include the elements illustrated in FIGS. 1 and 2. The electronic device according to various embodiments of the present disclosure may be various kinds of power adaptors such as a travel adaptor (TA) or a cradle adaptor (CA), etc., for supplying DC power to the smartphone or the tablet PC, etc.

The power adaptor may be called a power supply unit so that it may be discriminated from an electronic device such as the smartphone or the tablet PC, etc. Hereinafter, an electronic device such as the smartphone or the tablet PC, etc. may be denoted by a first electronic device, and the power adaptor may be denoted by a second electronic device.

Figure 3:
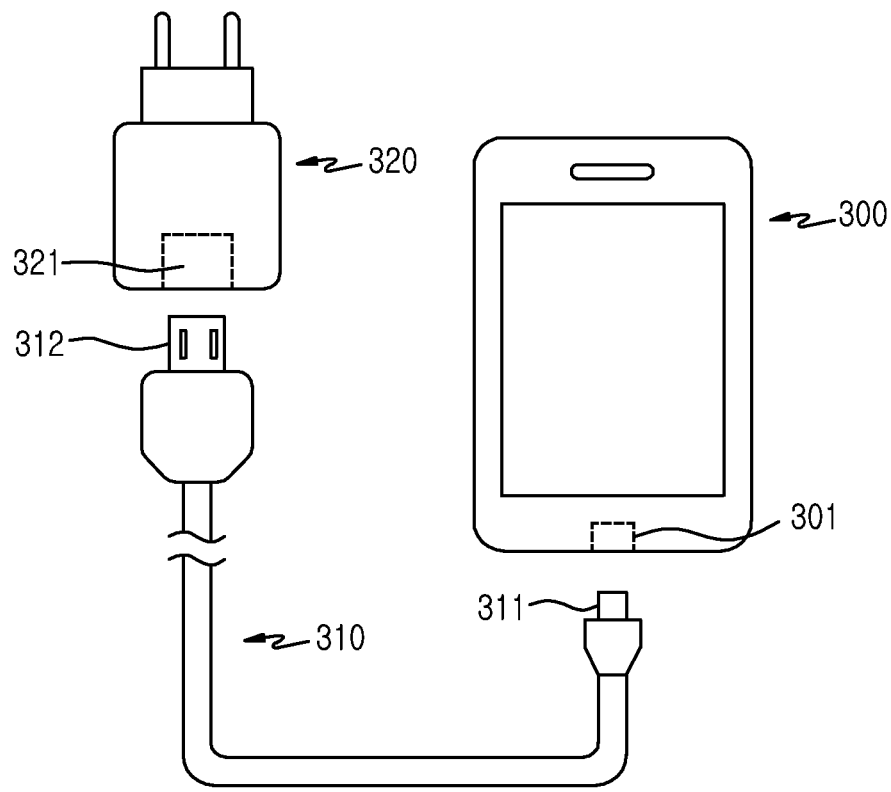
FIG. 3 is a view illustrating electronic devices are connected according to a first embodiment of the present disclosure.

FIG. 3 is a view illustrating electronic devices that are connected according to a first embodiment of the present disclosure. Referring to FIG. 3, for example, the first electronic device 300 such as the smartphone, etc. may be connected to the second electronic device 320 such as the TA via a power cable 310.

A first connector 311 for connecting with the first electronic device 300 is provided to one end of the power cable 310, and a second connector 312 for connecting to the second electronic device 320 may be provided to the other end of the power cable 310. For the first connector 311, a micro 5 pin connector, etc., for example, may be used. For the second connector 312, a Universal Serial Bus (USB) connector may be used. For the connector, various types of connectors such as a 30-pin connector, a μ (micro) USB 3.0 connector, or a DC jack, etc., may be used when needed.

A micro 5-pin connector 301 corresponding to the first connector 311 may be provided to the first electronic device 300, and a USB connector 321 corresponding to the second connector 312 may be provided to the second electronic device 320. The second electronic device 320 such as the TA, etc. may convert AC power to DC power and supply the same to the first electronic device 300. The first electronic device 300 may be supplied with DC power of the second electronic device to charge battery power, or may use the DC power as power operating respective elements inside the first electronic device 300.

Figure 4:
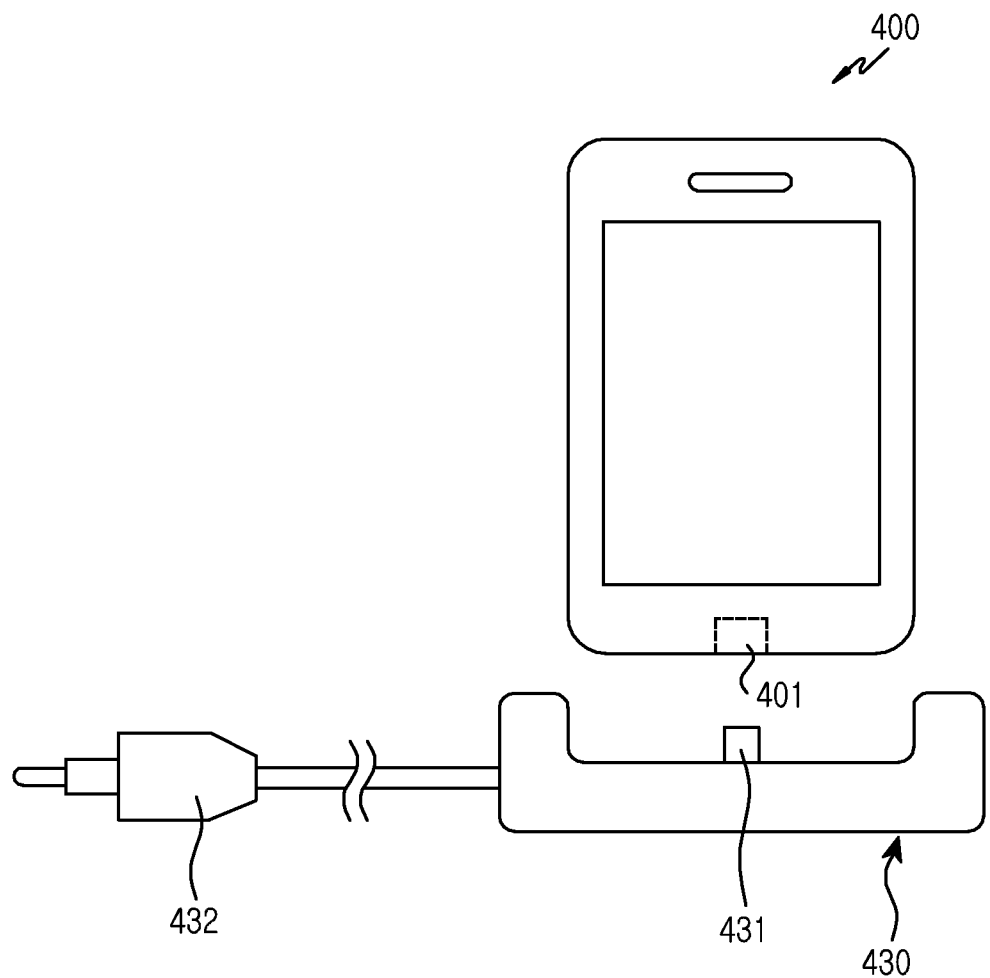
FIG. 4 is a view illustrating electronic devices are connected according to a second embodiment of the present disclosure.

FIG. 4 is a view illustrating electronic devices that are connected according to a second embodiment of the present disclosure. Referring to FIG. 4, a first electronic device 400 such as the smartphone, etc., for example, may be connected to and seated on a second electronic device 430 such as a CA, etc.

A first connector 431 for connecting with the first electronic device 400 may be provided to a first side such as the upper side of the second electronic device 430, and a power cord 432 may be provided to a second side such as the other side (ex: the front side, the lateral side, the backside, etc.) of the second electronic device 430.

For the first connector 431 of the second electronic device 430, a micro 5-pin connector, etc., for example, may be used. A micro 5-pin connector 401 corresponding to the first connector 431 may be provided to the first electronic device 400. For the connector, various types of connectors such as a 30-pin connector, a μ (micro) USB 3.0 connector, or a DC jack, etc., may be used when needed.

The second electronic device 430 such as the CA, etc. may convert AC power input via the power cord 432 to DC power and supply the same to the first electronic device 400. The first electronic device 400 may be supplied with DC power of the second electronic device to charge battery power, or may use the DC power to operate respective elements within the first electronic device 400.

Figure 5:
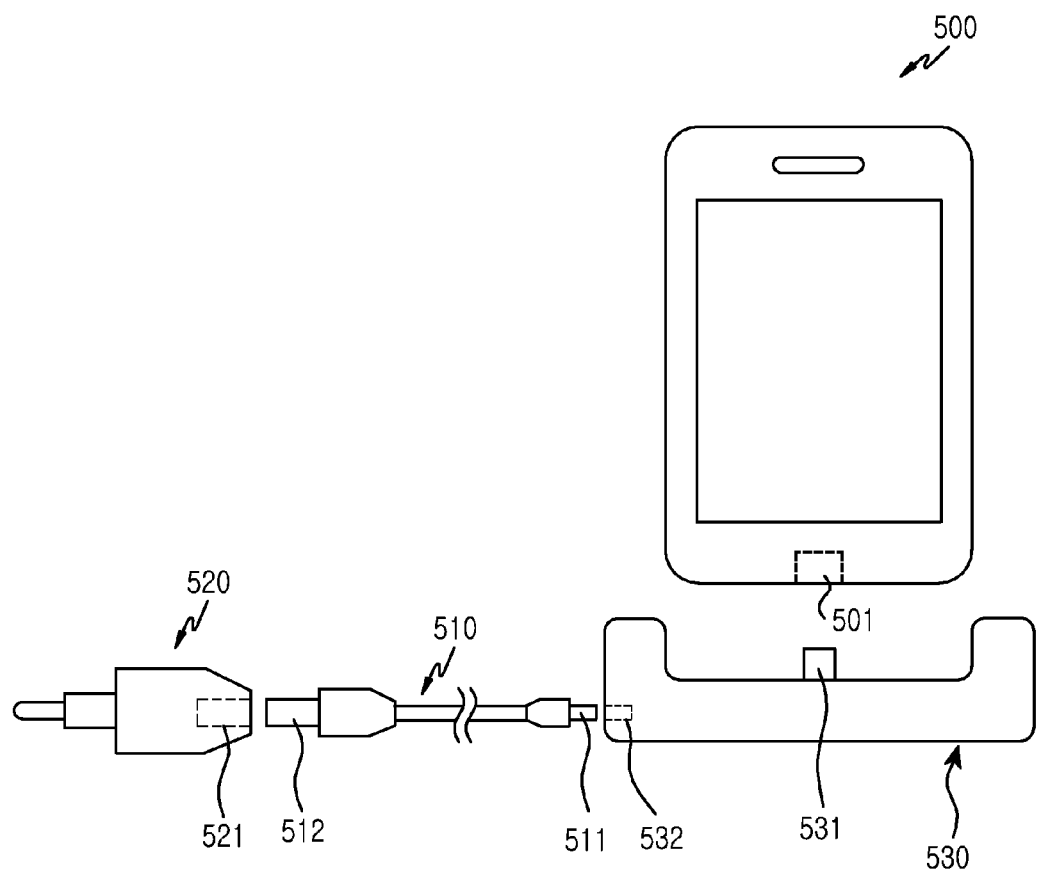
FIG. 5 is a view illustrating electronic devices are connected according to a third embodiment of the present disclosure.

FIG. 5 is a view illustrating electronic devices that are connected according to a third embodiment of the present disclosure. Referring to FIG. 5, a first electronic device 500 such as the smartphone, etc., for example, may be connected while it is seated on a second electronic device 530 such as a CA, etc. The CA may include various types of CAs equipped with additional functional elements, such as an audio speaker, etc.

A first connector 531 for connecting with the first electronic device 500 is provided to a first side such as the upper side of the second electronic device 530. A second connector 532 for connecting with a first connector 511 provided to one end of a power cable 510 may be provided to a second side such as the other side (ex: the front side, the lateral side, the backside, etc.) of the second electronic device 530.

A second connector 512 for connecting with a second electronic device 520 such as a TA may be provided to the other end of the power cable 510. For the first connector 531 of the second electronic device 530, and the first connector 511 of the power cable 510, a micro 5-pin connector, etc. may be used for example. For the second connector 512 of the power cable 510, a USB connector, etc. may be used.

A micro 5-pin connector 501 corresponding to the first connector 531 of the second electronic device 530 may be provided to the first electronic device 500, and a USB connector 521 corresponding to the second connector 512 of the power cable 510 may be provided to the second electronic device 520.

The second electronic device 520 such as the TA converts AC power to DC power and supplies the same to the second electronic device 530 such as the CA, etc., and the second electronic device 530 transfers the DC power to the first electronic device 500. The first electronic device 500 may be supplied with the DC power transferred by the second electronic device 530 to charge battery power, or use the DC power to operate respective elements within the first electronic device 500.

Figure 6:
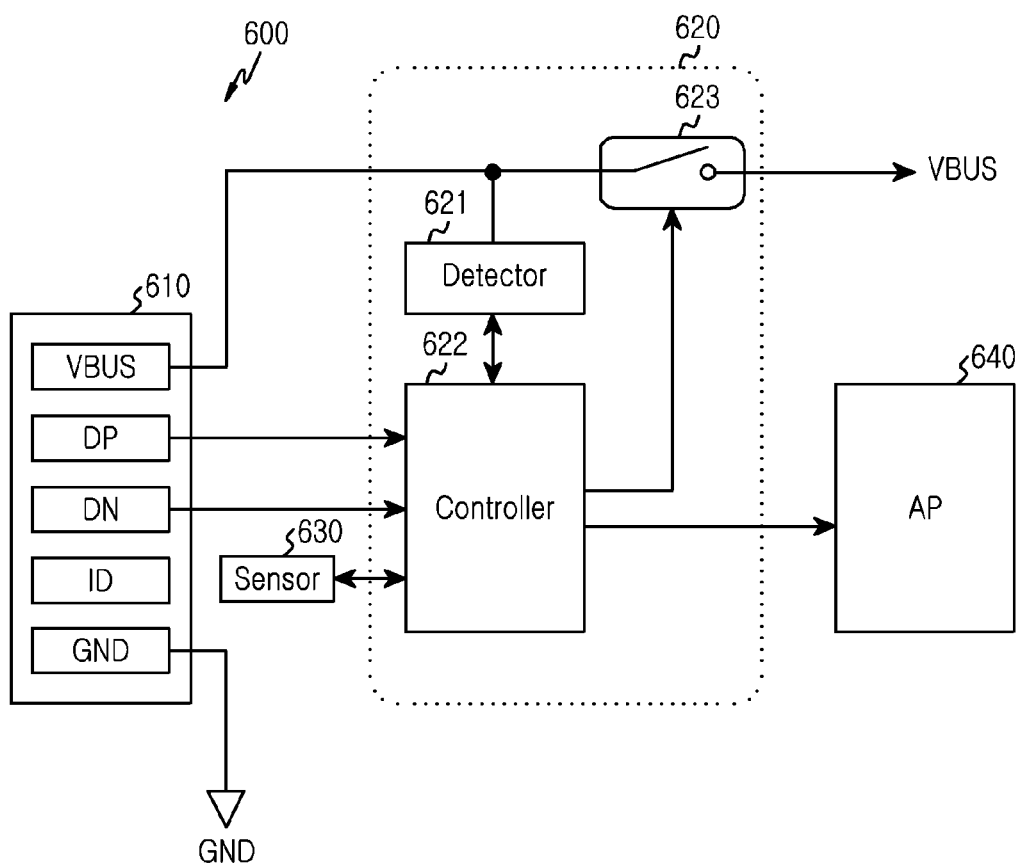
FIG. 6 is a view illustrating a partial configuration of a first electronic device according to various embodiments of the present disclosure.

FIG. 6 is a view illustrating partial configuration of a first electronic device according to various embodiments of the present disclosure. Referring to FIG. 6, various electronic devices 600, such as smartphones or a tablets, etc. may include a connector 610 for connecting with a TA or a CA, etc., and a power manager 620 for managing charging or power control, etc.

For the connector 610, a micro 5-pin connector may be used, for example. A first pin of the micro 5 pins may be used for a VBUS terminal for supplying power. A second pin and a third pin may be used for a data positive (DP) terminal and a data negative (DN) terminal for transmission/reception of a data pulse signal. A fourth pin may be used for an ID. A fifth pin may be used for a GND terminal for grounding.

All or a portion of the power manager 620 may be included in the power management module 295 described with reference to FIG. 2, for example. For example, the power manager 620 may be manufactured using a power management integrated circuit (PMIC), etc. As illustrated in FIG. 6, the power manager 620 may include a detector 621, a controller 622, and a switch 623. The detector 621 detects a change in a current or a voltage input via the VBUS terminal of the connector 610.

The controller 622 may control AP 640 activate or deactivate the switch 623 according to a change in the detected current or voltage, or activate or deactivate the switch 623 depending on an output of a temperature sensor 630 measuring temperature of a specific (or designated) portion or the neighboring portion (of the connector) of the pin terminals of the connector 610. The switch 623 is a power switch activated or deactivated according to the control of the controller 622, and blocks input of an overcurrent or an overvoltage via the VBUS terminal of the connector 610.

Figure 7:
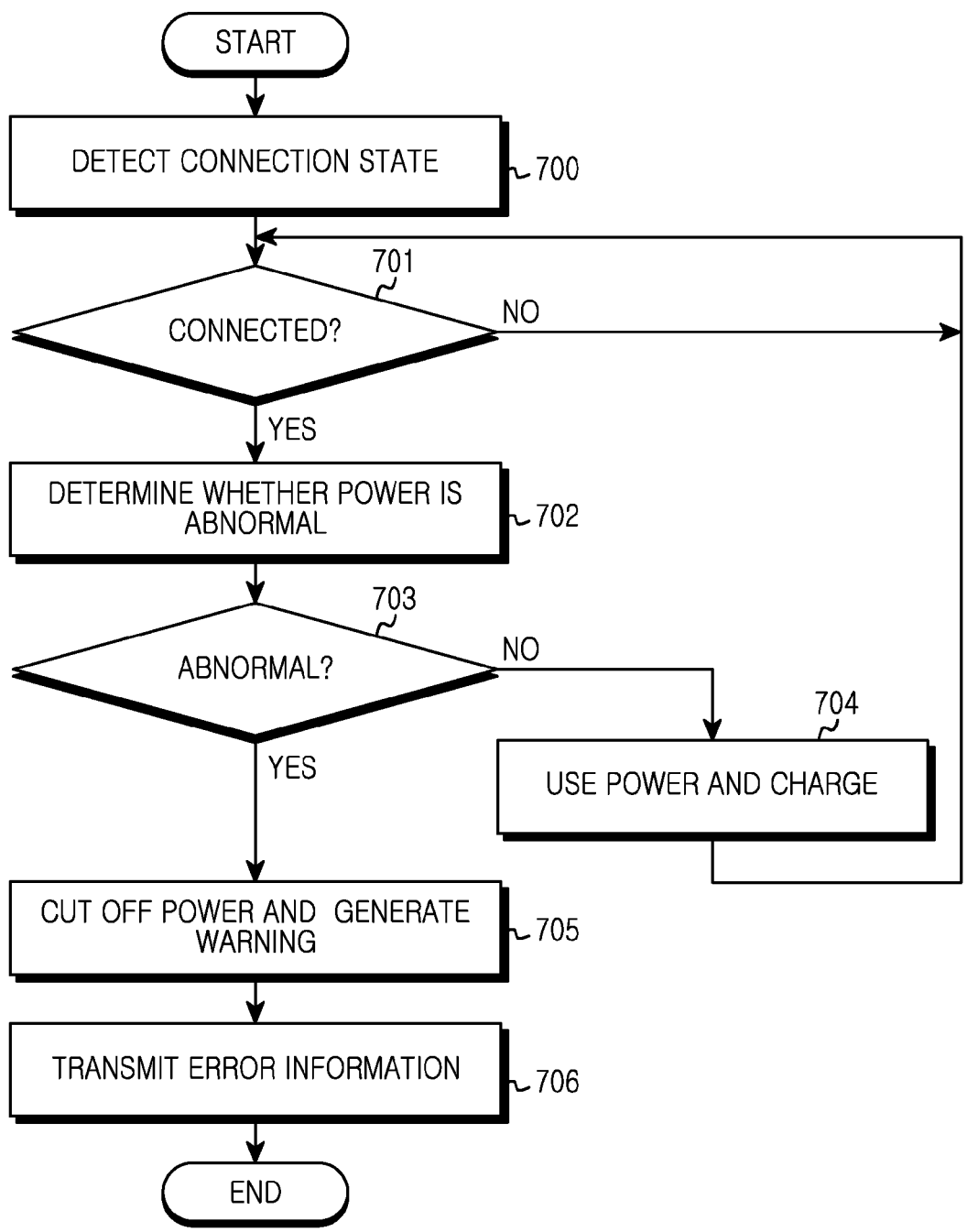
FIG. 7 is a flowchart illustrating a method for controlling power of a first electronic device according to various embodiments of the present disclosure.

FIG. 7 is a flowchart illustrating a method for controlling power for a first electronic device according to various embodiments of the present disclosure. Referring to FIG. 7, the controller 622 detects whether an electronic device such as a TA or a CA, etc. has been connected via the connector 610 in operation 700.

For example, the controller 622 controls an operation of the detector 621 to detect a voltage input via the VBUS terminal of the connector 610. When the detected VBUS voltage correlates with a predetermined reference voltage (ex: 5V or 9V), the controller 622 may determine that the TA or the CA, etc. has been connected to the electronic device, per operation 701. When the voltage is less than the predetermined reference voltage, the controller 622 may detect that the TA or the CA, etc. is not been connected, per operation 701.

In another embodiment, when a voltage level of a data pulse signal input via the DP terminal and the DN terminal of the connector 610 correlates with a reference voltage level (ex: 0.6V or 1.25V) set in advance, the controller 622 may detect that the TA or the CA, etc. has been connected, and when the voltage level is less than the reference voltage level, detect that the TA or the CA, etc. has not been connected.

The controller 622 controls an operation of the detector 621 or the temperature sensor 630, etc. to determine whether the power supply is abnormal in operation 702. For example, in the case where the pin terminals (ex: a VBUS terminal and a GND terminal) of the connector 610 are short-circuited by foreign substances, etc., high heat may be generated by leakage of the current, so that the temperature sensor 630 detects abnormal high temperature (which in some examples, may be set as 80 degrees or more)

When abnormal high temperature is detected by the temperature sensor 630 in operation 703, the controller 622 may determine that a power abnormality currently exists. In another embodiment, when a voltage level of a data pulse signal input via the DP terminal and the DN terminal of the connector 610 deviates from a reference voltage level range (ex: 0.6V~1.25V) set in advance, the controller 622 may determine that a power abnormality exists. Furthermore, the controller 622 controls an operation of the detector 621 to periodically or constantly detect a VBUS voltage or current input via the VBUS terminal of the connector 610.

A person of ordinary skill in the art should understand that referring to the power supplied being "abnormal" is defined in terms of a voltage value or a current value being higher or lower than a reference value or a reference value range. When a value different from a voltage or a current prescribed by the TA or the CA is detected, the controller 622 may ascertain the existence of a power abnormality. In one embodiment, the prescribed voltage or current may periodically change depending on a State Of Charge (SOC) value, which may represent a charging state of the electronic device. When power is detected as normal, based on a result of the determination, the controller 622 uses power input via the VBUS terminal to charge the device in operation 704. When the power is detected as abnormal based on the determination, the controller 622 deactivates the switch 623, thereby cutting the power input from the VBUS terminal in operation 705.

It is possible to display on a User Interface (UI) information indicating the user the state of the electronic device, including a warning message that power has been disabled, or some other message in cooperation with the AP 210 described with reference to FIG. 2 (and AP 640, described with reference to FIG. 6). For another embodiment, when the power is known to be abnormal as a result of determination, the controller 622 may disable a VBUS voltage by deactivating an Over Voltage Protection (OVP) IC (not shown) of the VBUS terminal, or cut off the VBUS voltage by turning off an internal charging IC (not shown), or gradually reduce a charging current of the internal charging IC.

The controller 622 may transmit error information indicating the power abnormality to a TA or a CA, etc. that is connected via the connector 610 in operation 706. The TA or the CA may then automatically cut off power supplying according to the content of the error information.

For example, the transmission of the error information may use one of DP/DN communication protocol, a voltage communication protocol of a VBUS terminal, voltage level adjustment, impedance adjustment, and Pulse Width Modulation (PWM)/Pulse Frequency Modulation (PFM), or may use a wireless transmission method or protocol. Furthermore, a leakage of current at the VBUS terminal of the connector 610 may be detected by the TA or the CA, etc. that is not connected via the connector 610, the controller 622 may then itself determine an error such as short-circuit or bad connection has occurred for the connector 610, and deactivate the switch 623, etc. in advance.

Figure 8:
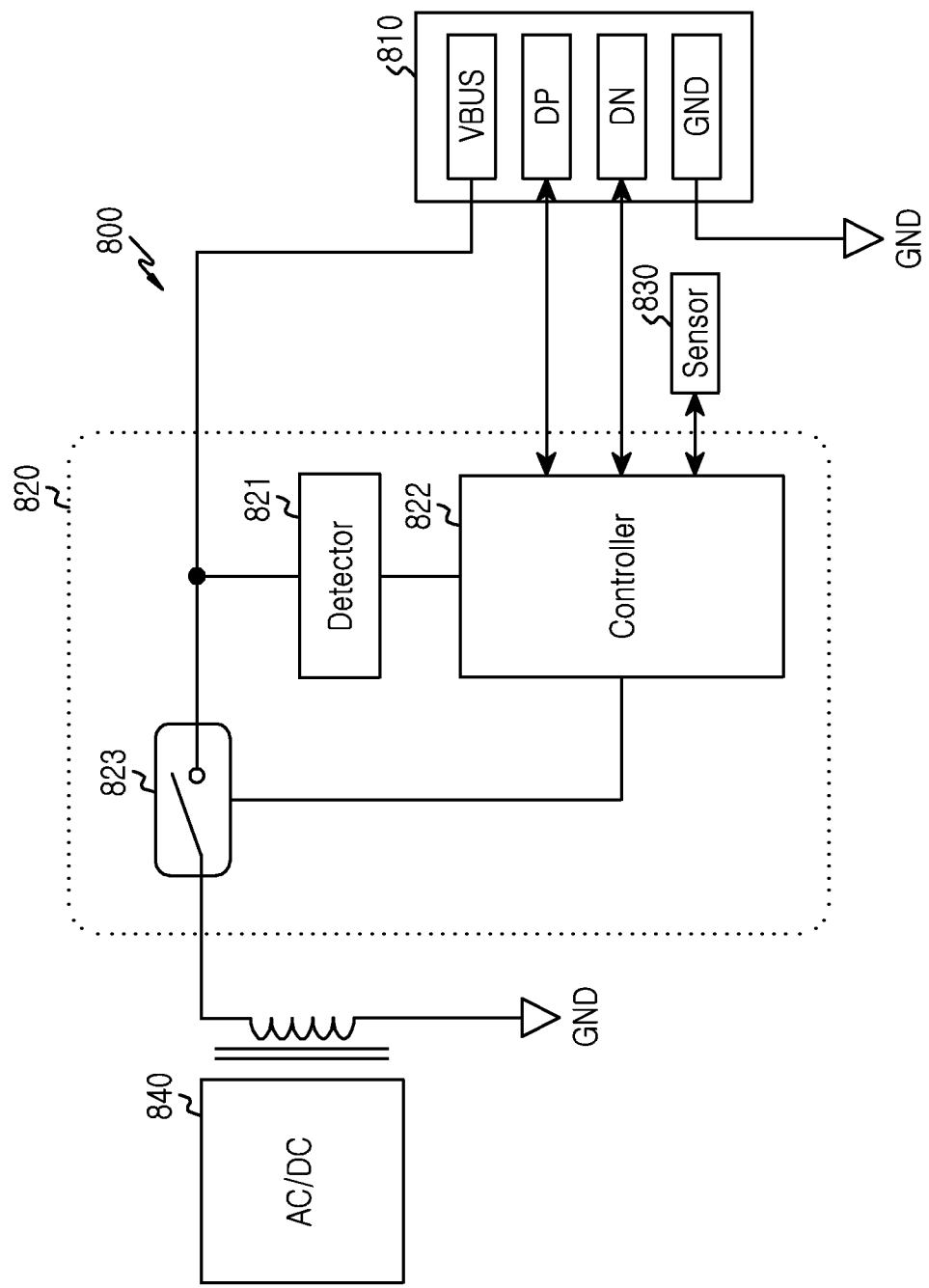
FIG. 8 is a view illustrating a partial configuration of a second electronic device according to various embodiments of the present disclosure.

FIG. 8 is a view illustrating a partial configuration of a second electronic device according to various embodiments of the present disclosure. Referring to FIG. 8, various types of second electronic devices 800 such as a TA or a CA, etc. may include a connector 810 for connecting with a first electronic device such as a smartphone or a tablet PC, etc., and a power manager 820 for controlling and managing power supplying or blocking, etc.

For the connector 810, a USB 4-pin connector may be used, for example. A first pin of the USB 4 pins may be used for a VBUS terminal for supplying power. A second pin and a third pin may be used for a data positive (DP) terminal and a data negative (DN) terminal for transmission/reception of a data pulse signal. A fourth pin may be used for a GND terminal for grounding.

The power manager 820 may be manufactured using a PMIC, etc., for example. The power manager 820, as illustrated in FIG. 8, may include a detector 821, a controller 822, and a switch 823. The detector 821 is installed to a second side of an AC/DC converter 840 converting AC power to DC power to detect a change of a current or a voltage output via the VBUS terminal of the connector 810.

The controller 822 may activate or deactivate the switch 823 according to a change of the detected current or voltage, or activate or deactivate the switch 823 according to an output of a temperature sensor 830, which may measure temperature for a specific portion of the pin terminals, or a neighboring portion of the connector 810 near the pin terminals.

The controller 822 may disable the AD/DC converter to shutdown the same. The switch 823 is a power switch activated or deactivated by control of the controller 822, and blocks input of an overcurrent or an overvoltage from the VBUS terminal of the connector 810.

Figure 9:
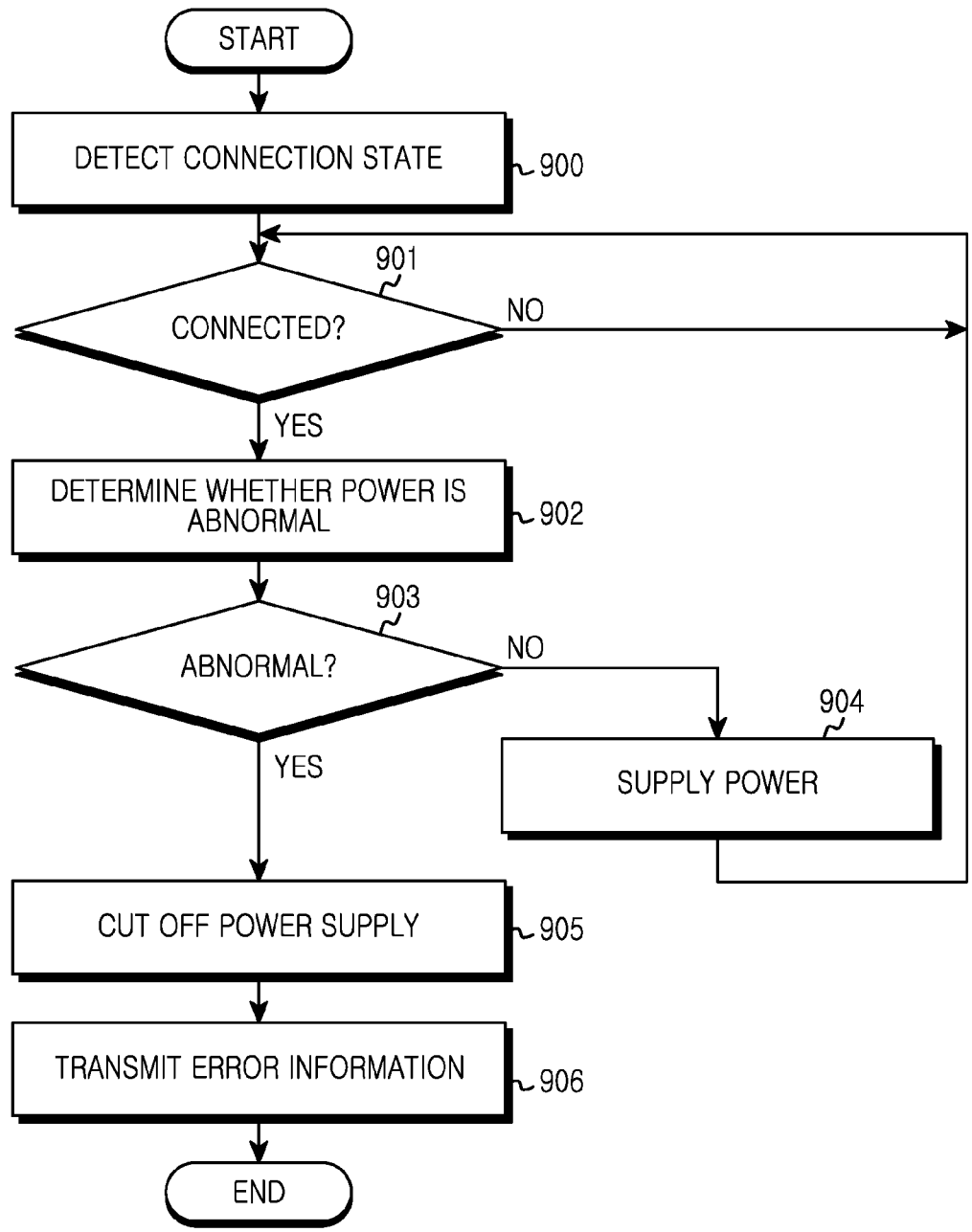
FIG. 9 is a flowchart illustrating a method for controlling power of a second electronic device according to various embodiments of the present disclosure.

FIG. 9 is a flowchart illustrating a method for controlling power of a second electronic device according to various embodiments of the present disclosure. Referring to FIG. 9, the controller 822 detects whether an electronic device such as a smartphone or a tablet PC, etc. has been connected via the connector 810 in operation 900.

For example, when a voltage level of a data pulse signal input via the DP terminal and the DN terminal of the connector 810 corresponds to a predetermined reference voltage level (ex: 0.6V or 1.25V), the controller 822 may detect that the smartphone or the tablet has been connected, and when the voltage level is less than the predetermine reference voltage level, the controller 822 may determine that the smartphone or the tablet has not been connected, in operation 901.

Furthermore, the controller 822 may detect voltage from a data pulse signal input via the DP terminal and the DN terminal of the connector 810 using a pulse width of a PWM or a frequency of a PFM.

When the connection is detected, the controller 622 controls an operation of the detector 821 and/or the temperature sensor 830, etc. to detect whether power is abnormal in operation 902. For example, when the pin terminals (ex: a VBUS terminal and a GND terminal) of the connector 821 are short-circuited by, for example, foreign substances, high heat is generated by a current leakage, and the temperature sensor 830 detects an abnormally high temperature (ex: 80 degrees or more). When an abnormally high temperature is detected by the temperature sensor 830 in operation 903, the controller 822 determines that a power abnormality is present.

In another embodiment, when a voltage level of a data pulse signal input via the DP terminal and the DN terminal of the connector 810 deviates from the reference voltage level (ex: 0.6V~1.25V) set in advance, the controller 822 may determine that a power abnormality exists.

Figure 10:
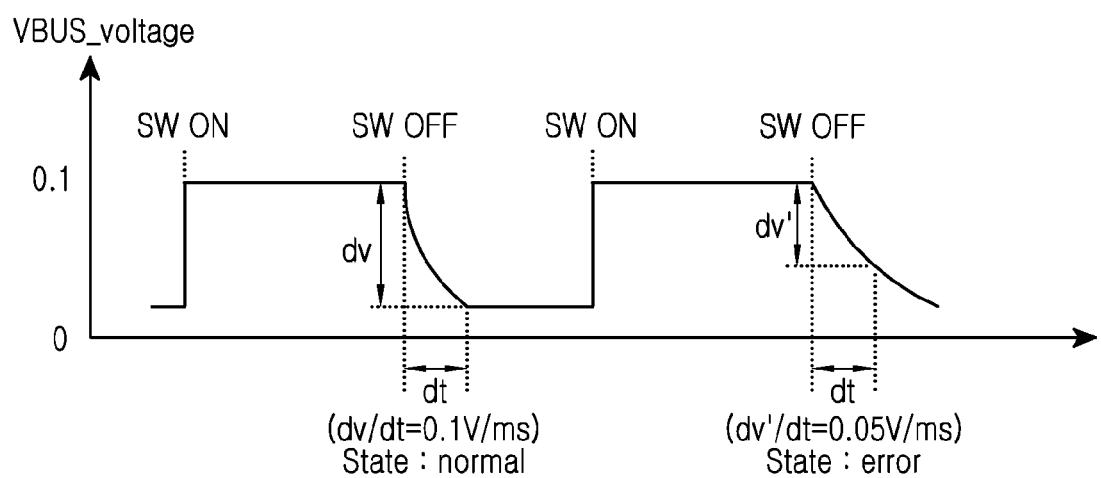
FIG. 10 is a graph illustrating a VBUS voltage drop detected according to various embodiments of the present disclosure.

Furthermore, the controller 822 may control the switch 823 to deactivate the switch 823 for a predetermined period, such as, for example, 100 ms repeated every five minutes, and control the detector 823 to detect a voltage drop of the VBUS terminal. Also, for example, as illustrated in FIG. 10, when a voltage drop of the VBUS terminal detected when the switch 823 is deactivated meets a predetermined reference value (ex: dv/dt=0.1 V/ms), the controller 822 may ascertain that power is normal, and when the voltage drop is less than the reference value, ascertain the power is abnormal.

Also, the controller 822 may control an operation of the detector 821 to periodically or constantly detect a VBUS voltage or current input via the VBUS terminal of the connector 810. When a value different from a voltage or a current prescribed by the TA or the CA is detected, the controller 822 may determine that a power abnormality exists. In an embodiment, the prescribed voltage or current may periodically change depending on a State Of Charge (SOC) value representing a charging state.

When power is detected as normal as a result of the determination, the controller 822 continues to allow the supply of power output via the VBUS terminal in operation 904. When power is detected as abnormal as a result of the determination, the controller 822 may deactivate the switch 823 to disable power output via the VBUS terminal in operation 905.

In another embodiment, when power is detected as abnormal as a result of the determination, the controller 822 may shutdown the AD/DC converter 840. The controller 822 may transmit error information indicating the power abnormality to a smartphone or a tablet PC, etc. connected via the connector 810 in operation 906.

The smartphone or the tablet PC may automatically cut off the supply of power according to the error information received. For example, the transmission of the error information may use one of DP/DN communication protocol, a voltage communication protocol of a VBUS terminal, voltage level adjustment, impedance adjustment, and Pulse Width Modulation (PWM)/Pulse Frequency Modulation (PFM), or may use a wireless transmission method.

Furthermore, when a current leakage at the VBUS terminal of the connector 810 is detected with the smartphone or the tablet PC, etc. that is not connected via the connector 810, the controller 822 may determine that a short-circuit or bad connection, etc. has occurred for the connector 810, and turn off the switch 823, etc. in advance.

According to various embodiments of the present disclosure, in situations where foreign substances. are inserted into an electronic device such as a TA or CAs (which may include additional functional elements such as an audio capacity in an audio dock) causing a short-circuit or bad connection, the controller 822 may prevent occurrence of an overcurrent or an overvoltage by detecting the power abnormality and cutting off power.

Also, in the cases where foreign substances are inserted into a connector of the electronic device such as a smartphone or a tablet PC, etc. causing a short-circuit or bad connection, the controller 822 may prevent occurrence of an overcurrent or an overvoltage by detecting the power abnormality caused by it and cutting off power.

According to various embodiments of the present disclosure, an electronic device such as, for example, a smartphone or a tablet PC, detects whether power supplied from a power supply unit such as a TA or a CA, etc. is abnormal. Accordingly, when the power supply is abnormal, the electronic device may respond to abnormal high heat generation or the occurrence of an overcurrent or an overvoltage. Thus, the electronic device may prevent an electronic components (such as those mounted on PCBs in the TA, CA, smartphone, tablet, etc.) the electronic device from being damaged or destroyed, and display a warning message or note, so that a user may recognize power abnormality has been generated.

According to various embodiments of the present disclosure, for example, a power supply unit such as a TA or a CA, etc. may determine whether power supplied to an electronic device such as a smartphone or a tablet PC, etc. is abnormal and control the power, thereby preventing abnormal high heat generation and occurrence of an overcurrent or an overvoltage, and preventing an electronic part, etc. mounted on a PCB from being destroyed.

Methods according to embodiments described in claims of various embodiment or embodiments described in specification of the present disclosure may be implemented in the form of a hardware, a software, or a combination of a hardware and a software. In case of implementation using a software, a computer-readable storage medium storing one or more programs (software modules) may be provided. One or more programs stored in the computer-readable storage medium are configured for execution by one or more processors 120 inside an electronic device. One or more programs include instructions allowing an electronic device to execute methods according to embodiments described in claims of various embodiment or embodiments described in specification of the present disclosure.

This program (a software module, a software) may be stored in a non-volatile memory including a Random Access Memory (RAM), and a flash memory, an Electrically Erasable Programmable Read Only Memory (EEPROM), a magnetic disc storage device, a Compact Disc (CD)-ROM, a Digital Video Disk (DVD), or other types of optical storage devices, and a magnetic cassette. Alternatively, the program may be stored in a memory configured using a combination of a portion or all of these. Also, a plurality of constituent memories may be provided.

Also, the program may be stored in an attachable storage device accessible via a communication network such as the Internet, an Intranet, a Local Area Network (LAN), a Wide LAN (WLAN), or a Storage Area Network (SAN), or a communication network configured using a combination of these. This storage device may access a device that performs an embodiment of the present disclosure via an external port. Also, a separate storage device on a communication network may access a device that performs an embodiment of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware circuitry in the claimed invention. Under the broadest reasonable interpretation, the appended claims constitute statutory subject matter in compliance with 35 U.S.C. § 101.

In specific embodiments of various embodiments of the present disclosure, an element included in the disclosure has been expressed in the singular or in the plural depending on a proposed specific embodiment. However, expression of the singular or the plural has been selected so that it is suitable for a suggested circumstance for convenience in description, and various embodiments of the present disclosure are not limited to a singular or plural element. Even an element expressed in the plural may be configured in the singular, or even an element expressed in the singular may be configured in the plural. Although the disclosure has been shown and described with reference to certain embodiments thereof, it will be understood by those skilled in the art that various changes in form and details may be made therein without departing from the disclosure as defined by the appended claims and their equivalents. Therefore, the scope of the present disclosure should not be limited to the above-described embodiments but should be determined by not only the appended claims but also the equivalents thereof.

What is claimed is:

1. A method for operating an electronic device, the method comprising:
   detecting, by a processor, a connection with a power supply unit through a connector;
   in response to detecting the connection with the power supply unit, determining, by the processor, whether power supplied from the power supply unit has an abnormal value;
   in response to detecting the abnormal value for the power, controlling, by the processor, to cut off the power input through the connector from the power supply unit;
   providing, by the processor, information associated with cut off of the power in cooperation with an application processor; and
   transmitting, by the processor, error information indicating a power abnormality to the power supply unit using a wireless transmission method via a communication interface.

2. The method of claim 1, wherein the electronic device is electrically coupled to the power supply unit via the connector having pin terminals, the method further comprising:
   detecting a state of the connection based on a comparison of voltage received along a data plus terminal of the pin terminals with a predetermined reference voltage.

3. The method of claim 2, wherein the determining whether the power supplied is abnormal further comprises:
   detecting at least one of a voltage change and a current change of electricity along a VBUS terminal of the pin terminals.

4. The method of claim 2, wherein the determining whether the power supplied has an abnormal value further comprises:
   detecting a level of voltage change of a data pulse signal of a data pulse terminal of the pin terminals.

5. The method of claim 2, wherein the determining whether the power supplied has an abnormal value further comprises:
   detecting at least one of a voltage value and a current value for the connector between the power supply unit and the electronic device, the at least one of the voltage value and the current value indicating a charging state of the electronic device.

6. The method of claim 2, wherein the determining whether the power supplied has an abnormal value is based on packet communication change between the power supply unit and the electronic device.

7. The method of claim 2, wherein the providing the information further comprising:
   when the power supplied is abnormal, disabling the power supplied from the power supply unit; and
   displaying, on a display of the electronic device a warning message indicating that power supplied from the power supply unit has an abnormal value in cooperation with an application processor of the electronic device.

8. The method of claim 2, wherein the controlling to cut off the power further comprises disabling a power switch of a VBUS terminal of the pin terminals.

9. The method of claim 2, wherein the controlling to cut off the power further comprises at least one of:
   disabling a VBUS voltage by deactivating an Over Voltage Protect Integrated circuit of a VBUS terminal of the pin terminals; or
   cutting off the VBUS voltage by turning off an internal charging IC.

10. An electronic device comprising:
    a display;
    a communication interface;
    a connector for electrically coupling with a power supply unit; and
    a processor configured to:
    detect a connection with the power supply unit through the connector,
    in response to detecting the connection with the power supply unit, detect whether power supplied from the power supply unit has an abnormal value, in response to detecting the abnormal value for the power, controlling to cut off the power input through the connector from the power supply unit, provide information associated with cut off of the power in cooperation with an application processor; and transmit error information indicating a power abnormality to the power supply unit as a wireless transmission method using the communication interface.

11. The electronic device of claim 10, wherein the connector comprises electrical pin terminals, the processor is further configured to detect a state of the connection based on a comparison of voltage received along a VBUS terminal of the pin terminals to a predetermined reference voltage.

12. The electronic device of claim 11, wherein the processor is further configured to detect the connection based on a comparison of voltage received along a data plus terminal of the pin terminals to a predetermined reference voltage.

13. The electronic device of claim 11, wherein the electronic device further comprising a temperature sensor to detect a temperate change on at least one of a designated portion of the pin terminals, or a portion of the connector adjacent to the pin terminals.

14. The electronic device of claim 11, wherein the processor is configured to determine whether the power supplied has an abnormal value by detecting at least one of a voltage change and a current change of electricity along a VBUS terminal of the pin terminals.

15. The electronic device of claim 11, wherein the processor is further configured to determine whether the power supplied is abnormal by detecting a level of voltage change of a data pulse signal of a data pulse terminal of the pin terminals.

16. The electronic device of claim 11, wherein the processor is further configured to:

when the power has an abnormal value, disable a power switch of a VBUS terminal of the pin terminals.

17. The electronic device of claim 11, wherein the processor is further configured to:

when the power supplied is abnormal, disable the power supplied from the power supply unit; and display, on the display of the electronic device a warning message indicating that power supplied from the power supply unit has an abnormal value in cooperation with an application processor of the electronic device.

18. The electronic device of claim 10, the connector including pin terminals, and the transmitting the error information utilizes at least one of:

a data positive/data negative communication protocol;

a voltage communication protocol of a VBUS terminal of the pin terminals;

a voltage level adjustment;

an impedance adjustment; or a pulse width modulation/pulse frequency modulation scheme.

19. A non-transitory computer-readable storage medium storing a program, that when executed, causes at least one processor to perform the method of claim 1.

* * * * *